United States Patent
Ogawa et al.

(10) Patent No.: US 11,827,211 B2
(45) Date of Patent: Nov. 28, 2023

(54) VEHICLE CONTROL SYSTEM

(71) Applicant: Mazda Motor Corporation, Hiroshima (JP)

(72) Inventors: Daisaku Ogawa, Aki-gun (JP); Osamu Sunahara, Aki-gun (JP); Daisuke Umetsu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 55 days.

(21) Appl. No.: 17/648,760

(22) Filed: Jan. 24, 2022

(65) Prior Publication Data

US 2022/0234571 A1  Jul. 28, 2022

(30) Foreign Application Priority Data

Jan. 25, 2021  (JP) ................................ 2021-009459

(51) Int. Cl.
*B60W 30/045*  (2012.01)

(52) U.S. Cl.
CPC ....... *B60W 30/045* (2013.01); *B60W 2540/18* (2013.01); *B60W 2710/083* (2013.01); *B60W 2720/106* (2013.01)

(58) Field of Classification Search
CPC .................................................. B60W 30/45
See application file for complete search history.

(56) References Cited

U.S. PATENT DOCUMENTS

| | | | |
|---|---|---|---|
| 8,989,981 B2 | 3/2015 | Yamakado et al. | |
| 9,919,603 B2 | 3/2018 | Yamakado et al. | |
| 11,173,884 B2 | 11/2021 | Sunahara et al. | |
| 2019/0193694 A1* | 6/2019 | Sunahara | B60T 8/1755 |
| 2022/0185249 A1* | 6/2022 | Nakagawa | B60W 30/045 |

FOREIGN PATENT DOCUMENTS

| | | |
|---|---|---|
| JP | 5143103 B2 | 2/2013 |
| JP | 6607532 B2 | 11/2019 |
| WO | 2015151565 A1 | 10/2015 |

\* cited by examiner

*Primary Examiner* — Imran K Mustafa
(74) *Attorney, Agent, or Firm* — Alleman Hall Creasman & Tuttle LLP

(57) ABSTRACT

A control system for a vehicle is provided, which includes a driving force source configured to generate torque for driving drive wheels, a steering wheel, a steering angle sensor, and a controller. Based on the detected steering angle, the controller reduces the driving torque to add deceleration to the vehicle when the steering wheel is being turned in one direction, and increases the torque to add acceleration when the steering wheel is being turned back in the other direction. The controller controls the torque, when the steering wheel is being turned in the returning direction from a state where it is turned in the one direction, so as to add forward acceleration until the steering wheel returns to a neutral position, and when the steering wheel is then being turned in the other direction after passing through the neutral position, so as not to add the forward acceleration.

6 Claims, 7 Drawing Sheets

VEHICLE CONTROL SYSTEM

TECHNICAL FIELD

The present disclosure relates to a control system for a vehicle, which controls attitude of the vehicle according to steering.

BACKGROUND OF THE DISCLOSURE

Conventionally, a technique is known for controlling attitude of a vehicle by causing deceleration or acceleration in the vehicle according to a driver's operation of a steering wheel to improve the response and the stability of the vehicle behavior with respect to the steering operation.

For example, WO2015/151565A1 discloses a motion control for a vehicle, in case of the vehicle turning, which decelerates the vehicle when the steering wheel is first turned in one direction, and accelerates the vehicle when the steering wheel is then returned. Thus, the maneuverability and the stability of the vehicle from an entry into a corner to an escape from the corner are improved.

In order to achieve the technique disclosed in WO2015/151565A1, when a turning operation of the steering wheel is carried out, a control (torque decreasing control) for reducing a driving torque generated by a driving force source of the vehicle is performed in order to add deceleration to the vehicle, and when a returning operation of the steering wheel is carried out, a control (torque increasing control) for increasing the driving torque generated by the driving force source is performed in order to add acceleration to the vehicle. Such a control can easily be achieved in a vehicle provided with an electric motor (for example, an electric vehicle). This is because the electric motor can promptly increase and decrease the output torque.

For example, in case of the vehicle traveling an S-shaped corner, the torque decreasing control is performed when the turning operation of the steering wheel is first carried out, the torque increasing control is performed when the returning operation of the steering wheel is then carried out, and the torque increasing control is ended when the steering wheel is then changed to the turning operation crossing the neutral position (that is, the steering angle is 0°). Here, even after the steering wheel passes through the neutral position after the returning operation, the torque increasing control may not be ended immediately but may be continued for a while because of a restriction, etc. of a rapid change in the torque. In this case, also during the turning operation of the steering wheel after passing through the neutral position, the torque generated by the driving force source is increased by the unfinished torque increasing control, and therefore, acceleration continues being added to the vehicle. As a result, the improvements in the maneuverability and the stability of the vehicle cannot be obtained, and it may give discomfort to the driver.

SUMMARY OF THE DISCLOSURE

The present disclosure is made in view of solving the problem described above, and one purpose thereof is to provide a control system for a vehicle, capable of controlling attitude of the vehicle according to steering, which improves maneuverability and stability of the vehicle without giving discomfort to a driver, when a returning operation is carried out from a state where a steering wheel is turned in one direction, and a turning operation is again carried out in the other direction after the steering wheel passes through a neutral position.

According to one aspect of the present disclosure, a control system for a vehicle is provided, which includes a driving force source configured to generate torque for driving drive wheels of the vehicle, a steering wheel configured to be operated by a driver, a steering angle sensor configured to detect a steering angle corresponding to operation of the steering wheel, and a controller configured to, based on the steering angle detected by the steering angle sensor, reduce the torque generated by the driving force source to add deceleration to the vehicle when the steering wheel is being turned in one direction, and increase the torque generated by the driving force source to add acceleration to the vehicle when the steering wheel is being turned back in the other, returning direction. The controller controls the torque generated by the driving force source, when the steering wheel is being turned in the returning direction from a state where the steering wheel is turned in the one direction, so as to add forward acceleration to the vehicle until the steering wheel returns to a neutral position, and when the steering wheel is then being turned in the other direction after passing through the neutral position, so as not to add the forward acceleration to the vehicle.

According to this configuration, when the turning operation of the steering wheel is carried out after crossing the neutral position, the forward acceleration being added to the vehicle by the increase in the torque generated by the driving force source can be prevented, unlike the case where the torque control for adding the forward acceleration is continued. Therefore, the maneuverability and the stability of the vehicle when the steering wheel passes through the neutral position after the returning operation and the turning operation is then carried out, can be improved, without giving discomfort to the driver.

The controller may perform a control for reducing the torque generated by the driving force source so as to add forward deceleration to the vehicle, when the steering wheel is turned in the returning direction from a state where the steering wheel is turned in the one direction, and the steering wheel is then being turned in the other direction after passing through the neutral position.

According to this configuration, the forward deceleration can promptly be added to the vehicle during the turning operation of the once returned steering wheel after passing through the neutral position, while suppressing discomfort given to the driver. Therefore, the maneuverability and the stability when the turning operation of the steering wheel is carried out after passing through the neutral position, can be improved to smoothen the behavior of the vehicle.

The controller may control the torque generated by the driving force source so that the forward acceleration added to the vehicle becomes smaller as the steering wheel becomes closer to the neutral position, when the steering wheel is being turned in the returning direction from a state where the steering wheel is turned in the one direction, until the steering wheel returns to the neutral position.

According to this configuration, the rapid change in the forward acceleration when the returning steering wheel passes through the neutral position can be avoided to prevent discomfort being given to the driver.

The driving force source may be comprised of an electric motor, and the controller may control torque generated by the electric motor.

According to this configuration, the torque generated by the driving force source can be controlled with the high response.

DETAILED DESCRIPTION OF THE DISCLOSURE

Hereinafter, a control system for a vehicle according to one embodiment of the present disclosure is described with reference to the accompanying drawings.

<Configuration of Vehicle>

Figure 1:
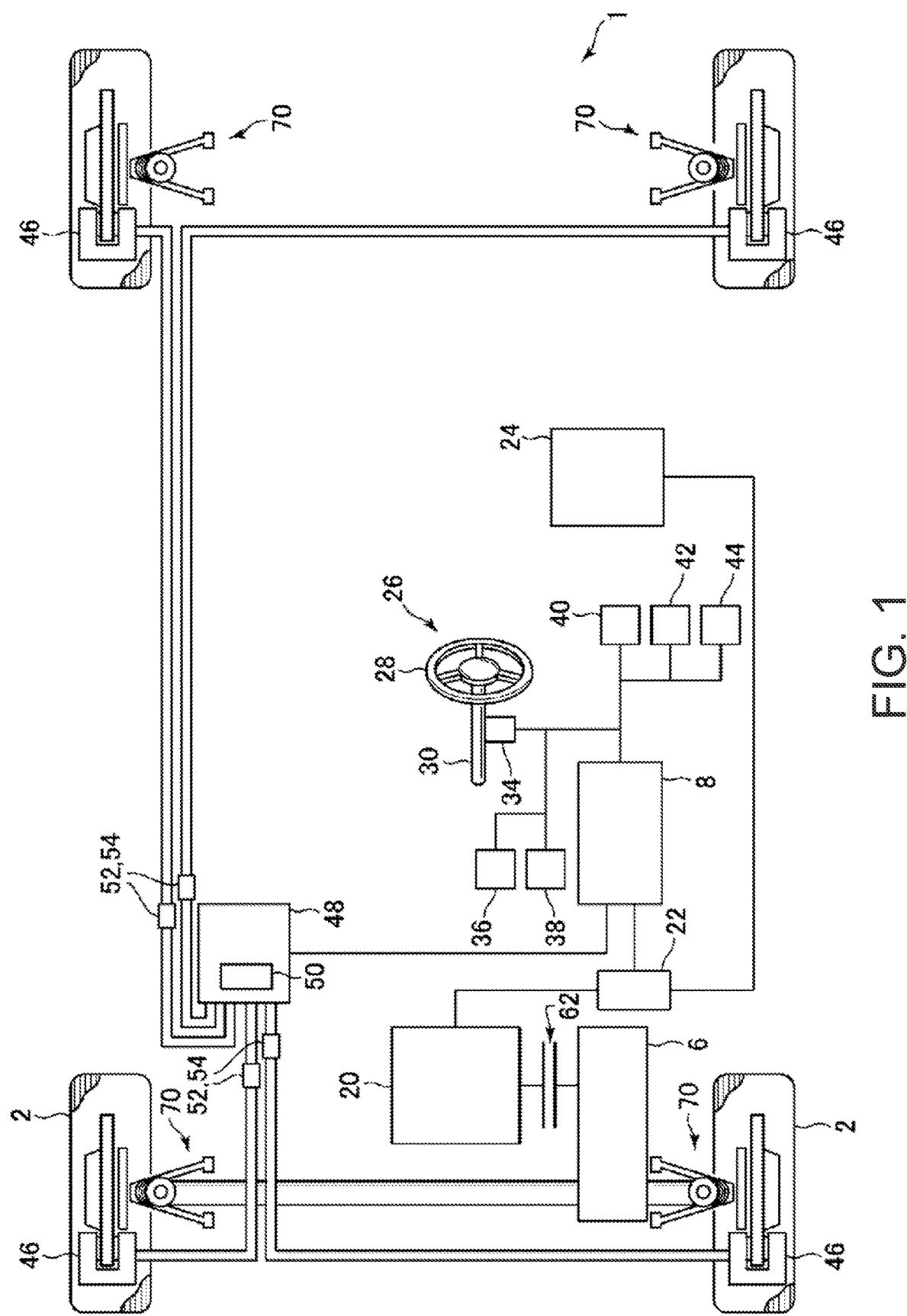
FIG. 1 is a block diagram schematically illustrating the overall configuration of a vehicle according to one embodiment of the present disclosure.
Figure 2:
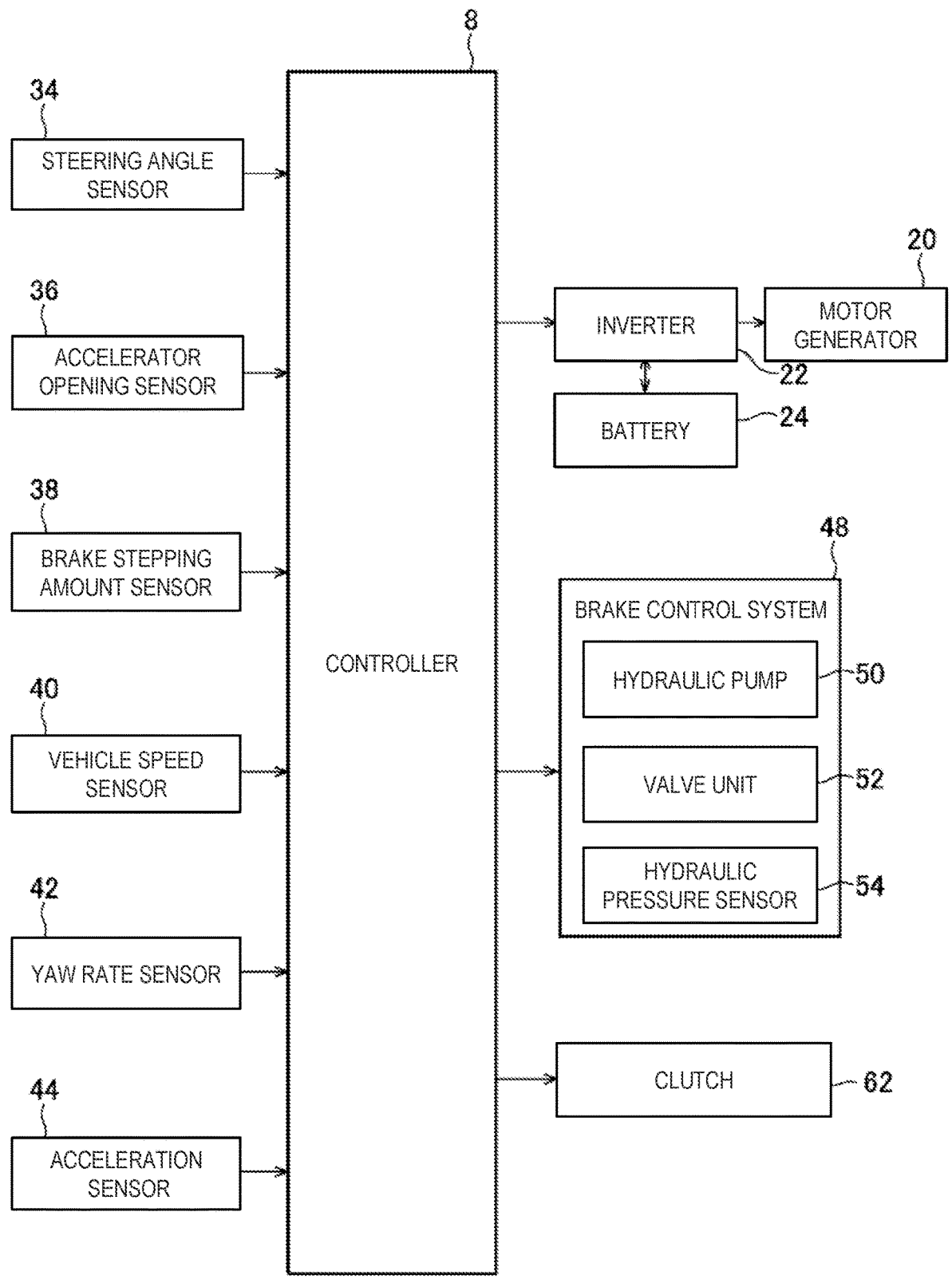
FIG. 2 is a block diagram illustrating an electric configuration of the vehicle according to this embodiment.

First, referring to FIGS. 1 and 2, the vehicle to which the control system for the vehicle according to this embodiment is applied is described. FIG. 1 is a block diagram schematically illustrating the entire configuration of the vehicle according to this embodiment. FIG. 2 is a block diagram illustrating the electric configuration of the vehicle according to this embodiment.

As illustrated in FIG. 1, a motor generator 20 (rotary electric machine) is mounted on a front part of a vehicle 1 as a motor (driving force source) which drives left and right front wheels 2 which are driving wheels. The vehicle 1 is configured as a so-called front-engine, front-wheel drive (FF) vehicle. Each wheel of the vehicle 1 is suspended from the vehicle body via a suspension 70 comprised of an elastic member (typically, a spring) and a suspension arm.

The motor generator 20 has a function to drive the front wheels 2 (that is, function as a prime motor (electric motor)) and a function to be driven by the front wheels 2 and to regenerate power (that is, function as a power generator). In the motor generator 20, a force is transmitted between the front wheels 2 via a transmission 6, and the motor generator 20 is controlled by a controller 8 via an inverter 22. Further, the motor generator 20 is connected to a battery 24. Electric power is supplied to the motor generator 20 from the battery 24 when the motor generator 20 generates a driving force, and the motor generator 20 supplies the power to the battery 24 and charges the battery 24 when it regenerates.

Further, in the vehicle 1, a rotation shaft of the motor generator 20 and a rotation shaft of the transmission 6 are coupled to each other via a clutch 62 which can engage and disengage. For example, switching between engagement and disengagement of the clutch 62 is controlled using oil pressure of the transmission 6.

The vehicle 1 includes a steering device 26 having a steering wheel 28 and a steering column 30, a steering angle sensor 34 which detects a steering angle in the steering device 26 based on a turning angle of the steering wheel 28 and the position of a steering rack (not illustrated), an accelerator opening sensor 36 which detects an accelerator opening equivalent to a stepping amount of an accelerator pedal, a brake stepping amount sensor 38 which detects a stepping amount of a brake pedal, a vehicle speed sensor 40 which detects a traveling speed of the vehicle, a yaw rate sensor 42 which detects a yaw rate, and an acceleration sensor 44 which detects acceleration of the vehicle. These sensors output respective detection values to the controller 8.

Note that the steering angle sensor 34 may detect, as the steering angle, various properties of the steering system (a rotation angle of the motor which adds assisting torque, a displacement of a rack in a rack-and-pinion mechanism, etc.), and a steered angle (tire angle) of the front wheels 2, instead of the turning angle of the steering wheel 28.

Further, the vehicle 1 is provided with a brake control system 48 which supplies brake fluid pressure to a wheel cylinder and a brake caliper of a brake device (brake mechanism) 46 provided to each wheel. The brake control system 48 is provided with a hydraulic pump 50 which generates brake fluid pressure required for generating a braking force at the brake device 46 provided to each wheel. The hydraulic pump 50 is driven, for example, by the power supplied from the battery 24, and even if the brake pedal is not stepped on, it can generate the brake fluid pressure required for generating the braking force in each brake device 46.

Further, the brake control system 48 is provided with a valve unit 52 (in detail, a solenoid valve) which is provided to a hydraulic pressure supply line to the brake device 46 of each wheel and controls the hydraulic pressure supplied to the brake device 46 of each wheel from the hydraulic pump 50. For example, the opening of the valve unit 52 is changed by adjusting the power from the battery 24 to the valve unit 52. The brake control system 48 is also provided with a hydraulic pressure sensor 54 which detects the hydraulic pressure supplied to the brake device 46 of each wheel from the hydraulic pump 50. The hydraulic pressure sensor 54 is disposed, for example, at a connecting part between each valve unit 52 and the hydraulic pressure supply line downstream thereof, detects the hydraulic pressure downstream of each valve unit 52, and outputs a detection value to the controller 8.

Such a brake control system 48 calculates the hydraulic pressure supplied independently to the wheel cylinder and the brake caliper of each wheel based on a braking force command value and the detection value from the hydraulic pressure sensor 54 which are inputted from the controller 8, and controls a rotational speed of the hydraulic pump 50 and the opening of the valve unit 52 according to the hydraulic pressures.

As illustrated in FIG. 2, the controller 8 according to this embodiment outputs control signals in order to perform controls of the motor generator 20, the clutch 62, and the hydraulic pump 50 and the valve unit 52 of the brake control system 48 based on the detection signals outputted from various kinds of operating state sensors which detect the operating state of the vehicle 1, in addition to the detection signals of the sensors 18, 34 36, 38, 40, 42, 44, and 54 which are described above.

The controller 8 is comprised of a circuitry, and is a controller based on a well-known microcomputer. The controller 8 includes one or more microprocessors (e.g., a CPU (Central Processing Unit)) which executes a program, memory which is comprised of, for example, RAM (Random Access Memory) and/or ROM (Read Only Memory) and stores the program and data, and an input/output bus which performs input/output of electric signals. Note that the system including the steering wheel 28, the steering angle sensor 34, and the controller 8 is an example of a "control system for a vehicle" in the present disclosure.

<Vehicle Attitude Control>

Below, a vehicle attitude control according to this embodiment of the present disclosure is described. In this embodiment, fundamentally, the controller 8 performs the following control in order to control the vehicle attitude (vehicle behavior) based on the steering angle detected by the steering angle sensor 34. First, when the turning operation is carried out so that the steering wheel 28 separates from the neutral position (i.e., when the steering angle increases) by being turned in one direction, the controller 8 performs the torque decreasing control for reducing the torque generated by the motor generator 20 so that forward deceleration (i.e., deceleration to decelerate the vehicle 1 which moves forward) is added to the vehicle 1. Further, when a returning operation is carried out so that the steering wheel 28 approaches the neutral position (i.e., when the steering angle decreases) by being turned in the other, returning direction, the controller 8 performs the torque increasing control for increasing the torque generated by the motor generator 20 so as to add forward acceleration (i.e., acceleration to accelerate the vehicle 1 which moves forward) to the vehicle 1. By performing such a vehicle attitude control, the turnability and the steering stability of the vehicle 1 from an entry into a corner to an escape from the corner can be improved.

Note that, below, the torque which is applied to the torque decreasing control (i.e., the negative torque which is added to the torque generated by the motor generator 20 in order to add the forward deceleration to vehicle 1) is referred to as the "reducing torque." Further, the torque which is applied to the torque increasing control (i.e., the positive torque which is added to the torque generated by the motor generator 20 in order to add the forward acceleration to the vehicle 1) is referred to as the "increasing torque." Further, when the reducing torque and the increasing torque are used without being distinguished from each other, each is referred to as the "additional torque." Such a reducing torque or increasing torque is applied to the vehicle attitude control. In detail, in the vehicle attitude control, the reducing torque or the increasing torque is subtracted or added from/to the torque to be generated by the motor generator 20 (hereinafter, referred to as the "basic torque") in order to achieve acceleration according to the operating state of the vehicle 1 (the accelerator opening, etc.). Below, the torque after the reducing torque or the increasing torque is thus subtracted from or added to the basic torque (i.e., the torque to be finally generated by the motor generator 20) is referred to as the "final target torque."

Figure 3:
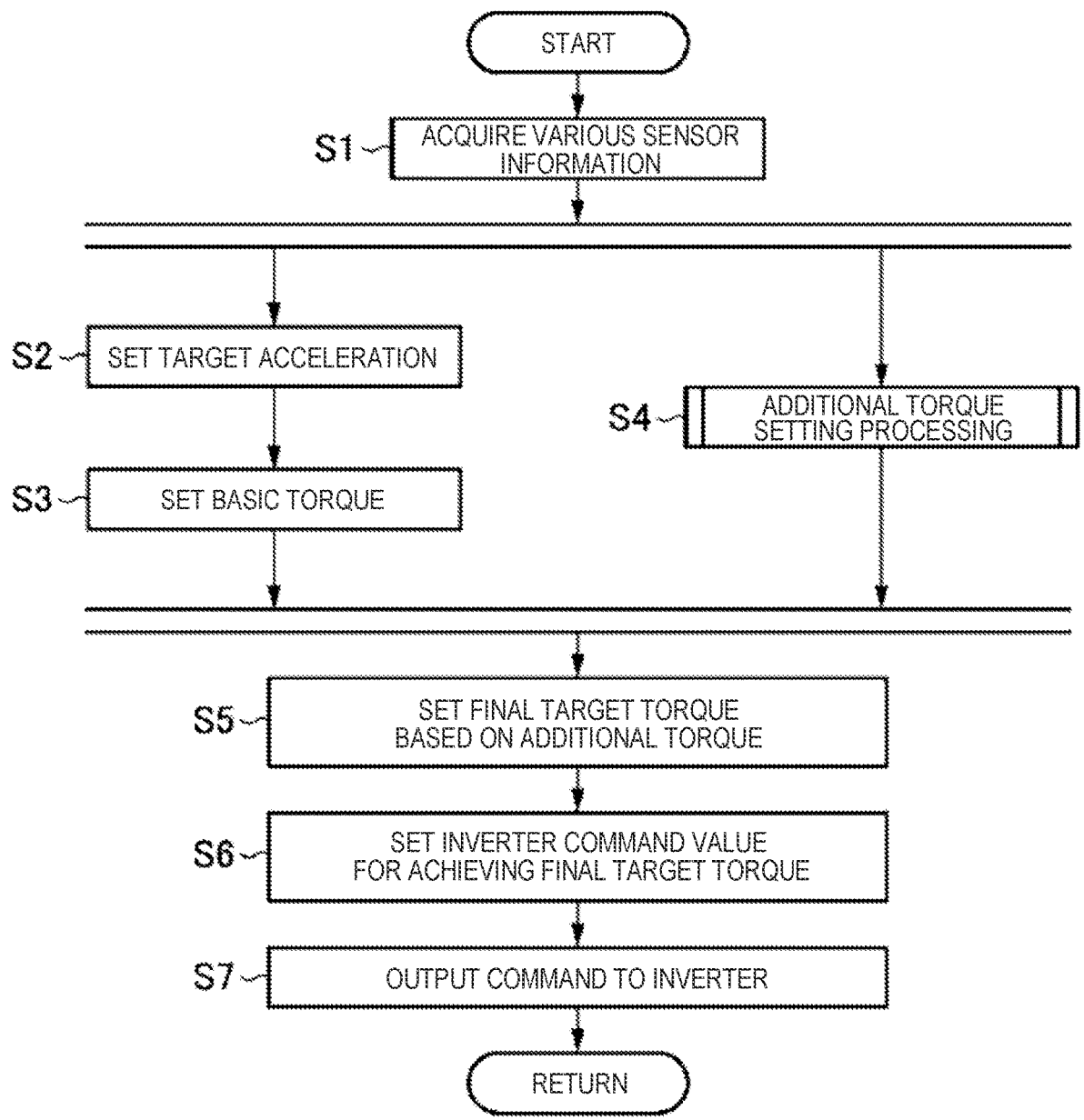
FIG. 3 is a flowchart of a vehicle attitude control processing according to this embodiment.

Next, referring to FIG. 3, the overall flow of the vehicle attitude control according to this embodiment is described. FIG. 3 is a flowchart of the vehicle attitude control processing according to this embodiment.

The vehicle attitude control processing in FIG. 3 is started when the ignition of the vehicle 1 is turned ON and the power is supplied to the controller 8, and it is repeatedly performed at a given period (for example, 50 ms). Once the vehicle attitude control processing is started, at Step S1, the controller 8 acquires the various sensor information on the operating state of the vehicle 1. In detail, the controller 8 acquires, as the information on the operating state, the detection signals outputted from the various sensors described above which includes the steering angle detected by the steering angle sensor 34, the accelerator opening detected by the accelerator opening sensor 36, the brake pedal stepping amount detected by the brake stepping amount sensor 38, the traveling speed or the vehicle speed detected by the vehicle speed sensor 40, the yaw rate detected by the yaw rate sensor 42, the acceleration detected by the acceleration sensor 44, the hydraulic pressure detected by the hydraulic pressure sensor 54, and the gear stage currently set to the transmission 6 of the vehicle 1.

Next, at Step S2, the controller 8 sets the target acceleration based on the operating state of the vehicle 1 acquired at Step S1. In detail, for example, the controller 8 selects an acceleration characteristics map corresponding to the current traveling speed and the current gear stage from the acceleration characteristics maps (created beforehand and stored in the memory, etc.) in which various traveling speeds and various gear stages are defined, and sets a target acceleration corresponding to the current accelerator opening with reference to the selected acceleration characteristics map.

Next, at Step S3, the controller 8 determines the basic torque of the motor generator 20 for achieving the target acceleration determined at Step S2. In this case, the controller 8 determines the basic torque within a range of the torque outputtable from the motor generator 20, based on the current traveling speed, gear stage, road surface gradient, road surface μ, etc.

Further, in parallel to the processings at Steps S2 and S3, at Step S4, the controller 8 performs an additional torque setting processing which will be described later (see FIG. 4), and based on the steering speed etc. of the steering wheel 28, it sets the additional torque (the reducing torque or the increasing torque) to be applied to the torque generated by the motor generator 20 in order to control the vehicle attitude.

Next, after Steps S2 to S4, at Step S5, the controller 8 sets the final target torque based on the basic torque set at Step S3 and the additional torque set at Step S4. Fundamentally, the controller 8 calculates the final target torque by subtracting the reducing torque from the basic torque, or adding the increasing torque to the basic torque.

Next, at Step S6, the controller 8 sets a command value for the inverter 22 (inverter command value) for achieving the final target torque set at Step S5. That is, the controller 8 sets the inverter command value (control signal) for causing the motor generator 20 to generate the final target torque. Then, at Step S7, the controller 8 outputs the inverter command value set at Step S6 to the inverter 22. After Step S7, the controller 8 ends the vehicle attitude control processing.

Figure 4:
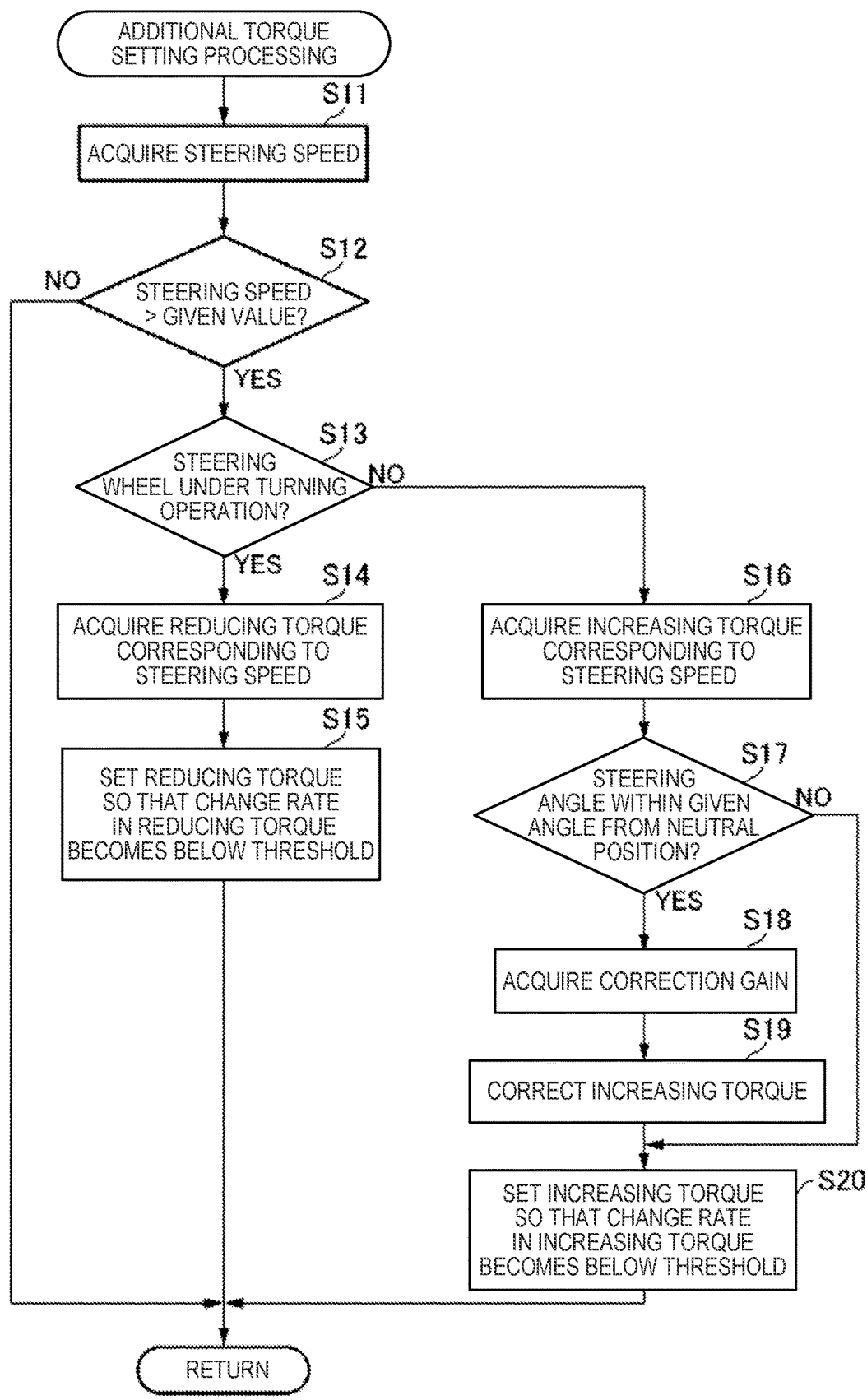
FIG. 4 is a flowchart of an additional torque setting processing according to this embodiment.

Next, referring to FIG. 4, the additional torque setting processing according to this embodiment is described. FIG. 4 is a flowchart of the additional torque setting processing according to this embodiment. This additional torque setting processing is performed at Step S4 of the vehicle attitude control processing illustrated in FIG. 3.

When the additional torque setting processing is started, at Step S11, the controller 8 acquires the steering speed based on the steering angle acquired from the steering angle sensor 34 at Step S1 of the vehicle attitude control processing illustrated in FIG. 3. Next, at Step S12, the controller 8 determines whether the steering speed acquired at Step S11 is above a given value. As a result, if the controller 8 determines that the steering speed is above the given value (Step S12: YES), it shifts to Step S13.

On the other hand, if the controller 8 does not determine that the steering speed is above the given value (Step S12: NO), it ends the additional torque setting processing and returns to the main routine. In this case, the additional torque becomes 0, and the basic torque set at Step S3 of the vehicle attitude control processing illustrated in FIG. 3 becomes the final target torque.

Next, at Step S13, the controller 8 determines whether the steering wheel 28 is under the turning operation. In detail, for example, when the absolute value of the steering angle acquired from the steering angle sensor 34 is increasing (i.e., when the steering angle of the steering wheel 28 is separating from the neutral position), the controller 8 determines that the steering wheel 28 is under the turning operation. On the other hand, for example, when the absolute value of the steering angle acquired from the steering angle sensor 34 is decreasing (i.e., when the steering angle of the steering wheel 28 is approaching the neutral position), the controller 8 determines that the steering wheel 28 is under the returning operation (that is, it is not under the turning operation). As a result, if the controller 8 determines that the steering wheel 28 is under the turning operation (Step S13: YES), it shifts to Step S14.

Figure 5A:
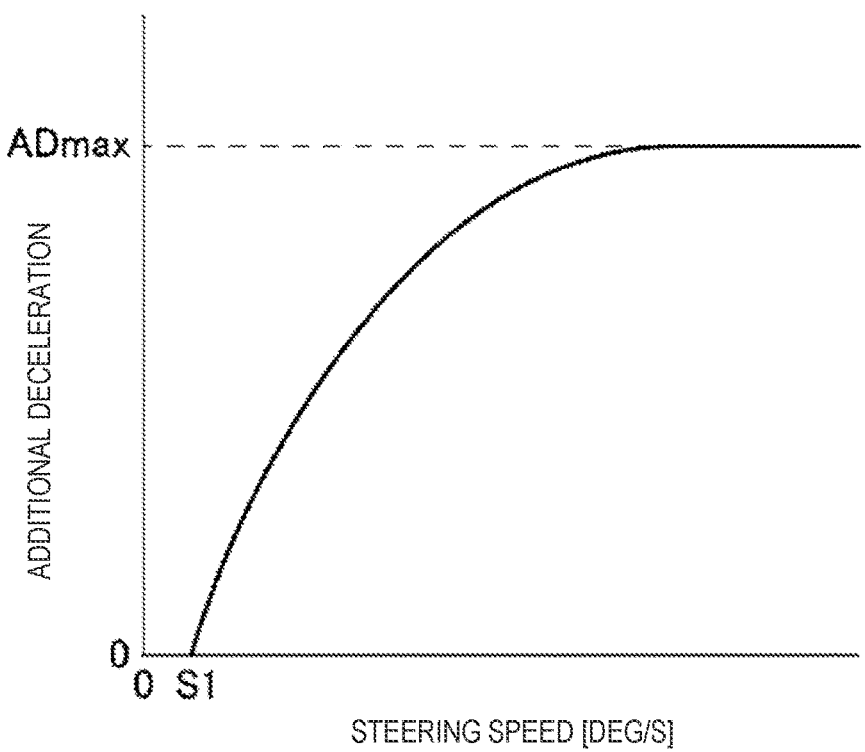
FIGS. 5A and 5B are maps each illustrating a relationship between a steering speed and an additional torque, according to this embodiment.

Next, at Step S14, the controller 8 acquires the reducing torque based on the steering speed. In detail, before acquiring the reducing torque, the controller 8 first sets the additional deceleration corresponding to the current steering speed based on the relationship between the steering speed and the additional deceleration as illustrated in the map of FIG. 5A. This additional deceleration is a forward deceleration to be added to the vehicle 1 according to the steering operation in order to control the vehicle attitude in accordance with the driver's intention of the turning operation of the steering wheel 28. In FIG. 5A, the horizontal axis indicates the steering speed, and the vertical axis indicates the additional deceleration. As illustrated in FIG. 5A, when the steering speed is below a threshold S1, the additional deceleration is 0. When the steering speed exceeds the threshold S1, the additional deceleration corresponding to this steering speed gradually approaches a given upper limit $AD_{max}$ as the steering speed increases. That is, as the steering speed increases, the additional deceleration increases, and an increasing rate of the amount of increase become smaller. This upper limit $AD_{max}$ is set to such a deceleration that, even if the deceleration is added to the vehicle 1 according to the steering operation, the driver does not sense a control intervention (for example, 0.5 m/s²≈0.05G). Further, when the steering speed becomes above the given value, the additional deceleration is maintained at the upper limit $AD_{max}$. Then, the controller 8 acquires the reducing torque based on the additional deceleration set in this way. In detail, the controller 8 determines the reducing torque required for achieving the additional deceleration by the reduction of the basic torque, based on the current traveling speed, gear stage, road surface gradient, etc.

Next, at Step S15, based on the reducing torque acquired at Step S14 and a threshold (defined beforehand and stored in the memory, etc.) which defines an upper limit of a rate of change in the reducing torque, the controller 8 sets the reducing torque in this processing cycle so that the rate of change in the reducing torque becomes below the threshold. After Step S15, the controller 8 ends the additional torque setting processing, and returns to the main routine. In this case, at Step S5 of the vehicle attitude control processing in FIG. 3, the controller 8 sets the final target torque based on the basic torque set at Step S3 and the reducing torque set at Step S15.

Further, at Step S13, if the controller 8 determines that the steering wheel 28 is not under the turning operation (Step S13: NO), in detail, if the absolute value of the steering angle acquired from the steering angle sensor 34 is decreasing (i.e., when the steering angle of the steering wheel 28 is approaching the neutral position), the controller 8 shifts to Step S16.

Figure 5B:
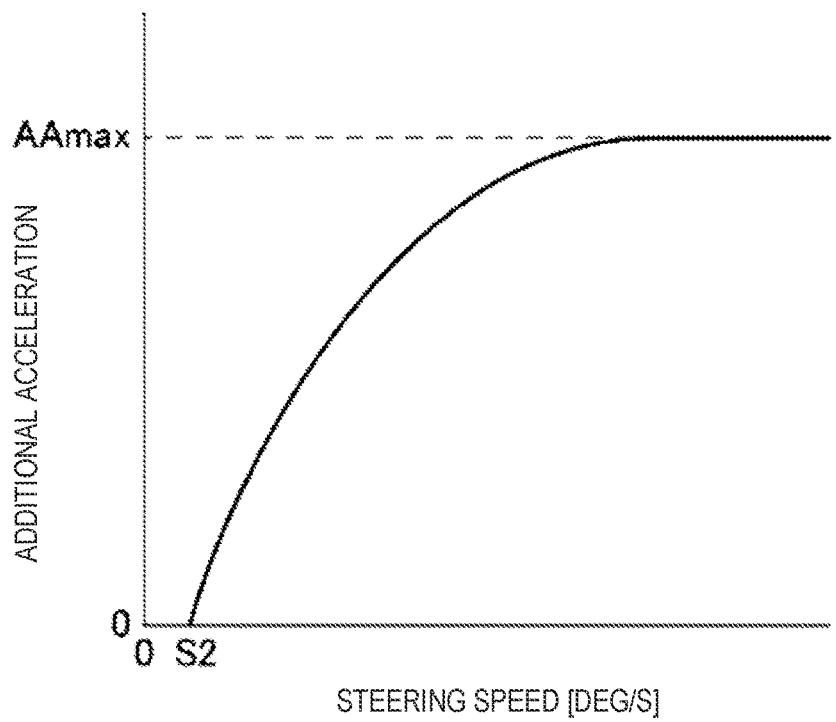

Next, at Step S16, the controller 8 acquires the increasing torque based on the steering speed. In detail, the controller 8 first sets the additional acceleration corresponding to the current steering speed based on the relation between the steering speed and the additional acceleration which are illustrated in the map of FIG. 5B, before setting the increasing torque. This additional acceleration is the forward acceleration to be added to the vehicle 1 according to the steering operation, in order to control the vehicle attitude in accordance with the driver's intention of the returning operation of the steering wheel 28. In FIG. 5B, the horizontal axis indicates the steering speed and the vertical axis indicates the additional acceleration. As illustrated in FIG. 5B, the additional acceleration is 0 when the steering speed is below a threshold S2. When the steering speed exceeds the threshold S2, the additional acceleration corresponding to this steering speed gradually approaches a given upper limit $AA_{max}$ as the steering speed increases. That is, as the steering speed increases, the additional acceleration increases and an increasing rate of the amount of increase thereof becomes smaller. This upper limit $AA_{max}$ is set to such an acceleration that the driver does not sense the control intervention even if the acceleration is added to the vehicle 1 according to the steering operation (for example, 0.5 m/s²≈0.05G). Further, the additional acceleration is maintained at the upper limit $AA_{max}$, when the steering speed becomes above the given value. Then, the controller 8 acquires the increasing torque based on the additional acceleration set in this way. In detail, the controller 8 determines the increasing torque required for achieving the additional acceleration with the increase in the basic torque, based on the current traveling speed, gear stage, road surface gradient, etc.

Next, at Step S17, the controller 8 determines whether the steering angle acquired from the steering angle sensor 34 is below the given angle (for example, below 30° clockwise and counterclockwise) from the neutral position (that is, the steering angle is 0°). As a result, if the controller 8 determines that the steering angle is below the given angle from the neutral position (Step S17: YES), that is, if the steering wheel which is under the returning operation comes in a range near the neutral position, the controller 8 shifts to Step S18.

Figure 6:
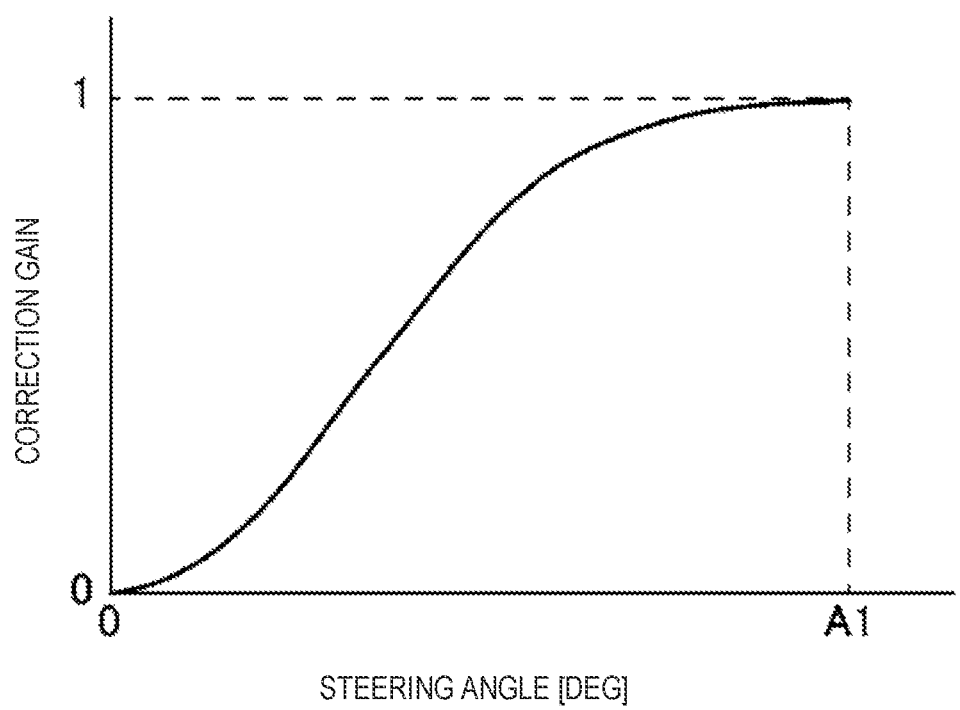
FIG. 6 is a map illustrating a relationship between a steering angle and a correction gain for an increasing torque, according to this embodiment.

Next, at Step S18, the controller 8 acquires the correction gain for correcting the increasing torque. In detail, the controller 8 acquires the correction gain corresponding to the current steering angle based on the relation between the steering angle and the correction gain illustrated in the map of FIG. 6. This correction gain is a correction gain to be multiplied by the increasing torque, when the steering wheel 28 is under the returning operation, so that the forward acceleration to be added to the vehicle 1 becomes smaller as the steering wheel 28 is closer to the neutral position. In FIG. 6, the horizontal axis indicates the steering angle, and the vertical axis indicates the correction gain. As illustrated in FIG. 6, when the steering angle is a given angle A1 (for example, 30°), the correction gain is 1. When the steering angle is smaller than the given angle A1, the correction gain corresponding to this steering angle becomes smaller as the steering angle approaches 0° (that is, as the steering wheel 28 is closer to the neutral position). When the steering angle is 0° (i.e., when the steering wheel 28 is at the neutral position), the correction gain becomes 0. Further, the rate of change in the correction gain according to the change in the steering angle (the slope of the graph illustrated in FIG. 6) becomes smaller as the steering angle approaches 0° and the given angle A1.

Next, at Step S19, the controller 8 corrects the increasing torque acquired at Step S16 by using the correction gain acquired at Step S18. In detail, the controller 8 multiplies the correction gain acquired at Step S18 by the increasing torque acquired at Step S16. By correcting in this way, when the steering wheel 28 is under the returning operation, the increasing torque becomes smaller as the steering angle is closer to 0° if the steering angle is below the given angle A1 from the neutral position. Then, the increasing torque becomes 0 when the steering angle reaches 0°.

Next, at Step S20, based on the increasing torque corrected at Step S19 and a threshold (defined beforehand and stored in the memory, etc.) which defines the upper limit of a rate of change in the increasing torque, the controller 8 sets the increasing torque in this processing cycle so that the rate of change in the increasing torque becomes below the threshold.

Further, at Step S17, if the controller 8 determines that the steering angle is not below the given angle from the neutral position (Step S17: NO), that is, if the steering wheel which is under the returning operation is not within the range near the neutral position, it shifts to Step S20, without correcting the increasing torque. In this case, at Step S20, based on the increasing torque acquired at Step S16 and the threshold which defines the upper limit of the change rate in the increasing torque, the controller 8 sets the increasing torque in this processing cycle so that the rate of change in the increasing torque becomes below the threshold.

After Step S20, the controller 8 ends the additional torque setting processing, and returns to the main routine. In this case, at Step S5 of the vehicle attitude control processing in FIG. 3, the controller 8 sets the final target torque based on the basic torque set at Step S3 and the increasing torque set at Step S20.

<Operation and Effects>

Figure 7:
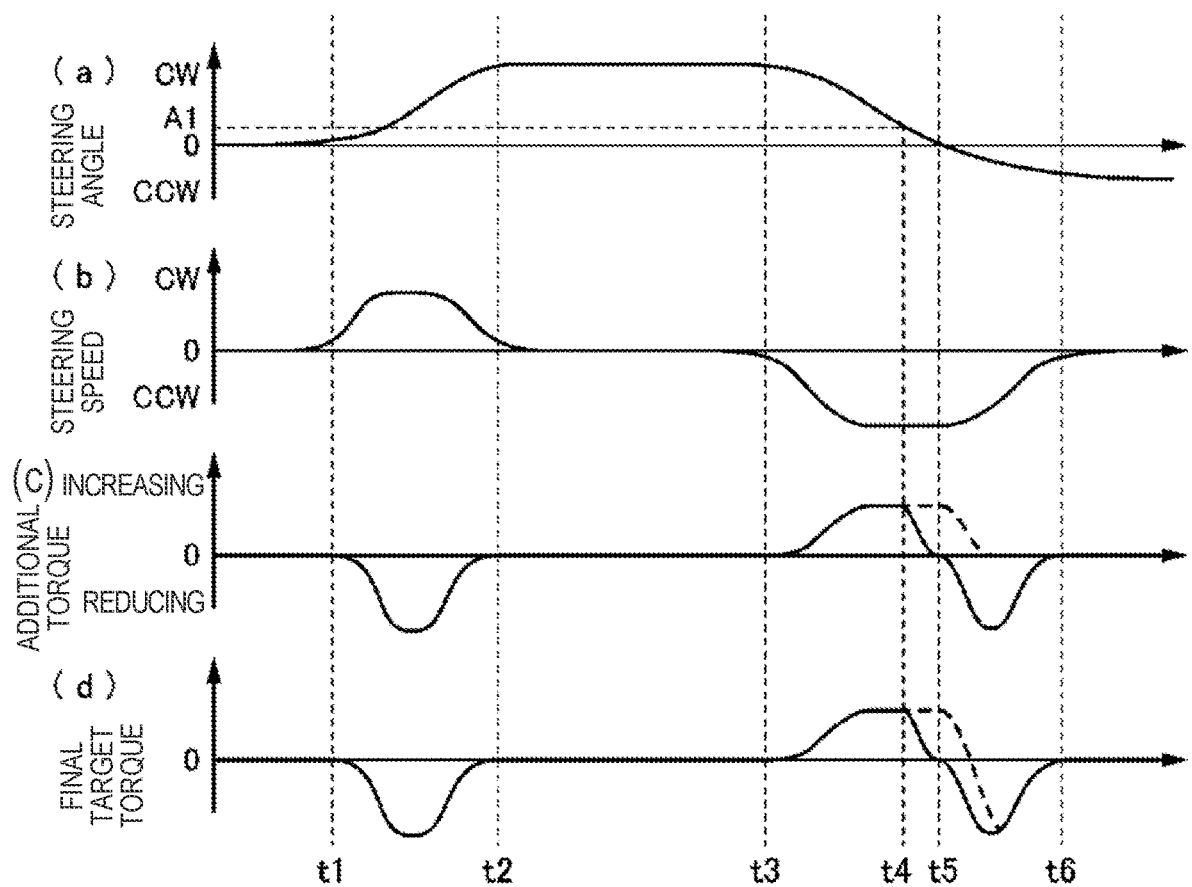
FIG. 7 is a time chart when performing the vehicle attitude control according to this embodiment.

Next, referring to a time chart in FIG. 7, operation and effects of the control system for the vehicle according to this embodiment are described. FIG. 7 is a time chart when performing the vehicle attitude control according to this embodiment described above. In FIG. 7, the horizontal axis indicates time. Further, the vertical axis indicates (a) steering angle, (b) the steering speed, (c) the additional torque (including the reducing torque and the increasing torque), and (d) the final target torque, sequentially from the top. In the graphs (c) and (d) of FIG. 7, a solid line illustrates the changes in the increasing torque and the final target torque when applying the correction gain illustrated in FIG. 6 to the increasing torque, and a broken line illustrates the changes in the increasing torque and the final target torque when not applying the correction gain to the increasing torque.

As illustrated in the graph (a) of FIG. 7, the turning operation of the steering wheel 28 is first carried out clockwise (CW) from the neutral position, the rotational position of the steering wheel 28 is then held at a certain steering angle, the returning operation is then carried out until the steering wheel 28 returns to the neutral position, the turning operation is then continuously carried out counterclockwise (CCW) even after the steering wheel 28 passes through the neutral position, and the rotational position of the steering wheel 28 is then held at a certain steering angle.

In connection with the turning operation of the steering wheel 28 being started in the CW direction from the neutral position, the steering speed (absolute value) in the CW direction increases. When the steering speed becomes above the threshold S1 at time t1, the controller 8 sets the reducing torque based on the steering speed so as to add the forward deceleration to the vehicle 1, and performs the torque decreasing control for reducing the torque generated by the motor generator 20. Then, the controller 8 increases the reducing torque (absolute value) according to the steering speed while the steering speed increases, and when the steering speed becomes constant, it maintains the reducing torque. Further, when the steering speed decreases, it decreases the reducing torque (absolute value) accordingly.

Then, when the steering speed becomes below the threshold S1 at time t2 by the steering wheel 28 being held after the turning operation, the controller 8 ends the torque decreasing control and the additional torque becomes 0. That is, the forward deceleration added to the vehicle 1 becomes 0.

Then, in connection with the returning operation being carried out counterclockwise (CCW) toward the neutral position from the state where the steering wheel 28 is turned in the CW direction, the steering speed (absolute value) in the CCW direction increases. When the steering speed becomes above the threshold S2 at time t3, the controller 8 sets the increasing torque based on the steering speed so that the forward acceleration is added to the vehicle 1, and performs the torque increasing control for increasing the torque generated by the motor generator 20. Then, the controller 8 increases the increasing torque (absolute value) according to the steering speed, while the steering speed increases, and when the steering speed becomes constant, it maintains the increasing torque.

Then, when the steering wheel 28 under the returning operation approaches the neutral position and the steering angle (absolute value) becomes below the given angle A1 at time t4, the controller 8 applies the correction gain to the increasing torque, and performs the torque increasing control with the corrected increasing torque. As described above, the correction gain corresponding to this steering angle is set so that it becomes smaller as the steering angle approaches 0°, and it becomes 0 when the steering angle is 0°. Therefore, the controller 8 decreases the increasing torque (absolute value) as the steering angle becomes smaller, and sets the increasing torque to 0 when and the steering angle becomes 0° at time t5. Thus, when the steering wheel 28 is under the returning operation, the forward acceleration added to the vehicle 1 becomes smaller as the steering angle becomes smaller than the given angle A1, and the forward acceleration added to the vehicle 1 becomes 0 when the steering angle becomes 0° at time t5.

Then, when the steering wheel 28 is turned continuously to counterclockwise (CCW) even after passing through the neutral position at time t5, the controller 8 sets the reducing torque based on the steering speed so as to add the forward deceleration to the vehicle 1, and performs the torque decreasing control for reducing the torque generated by the motor generator 20. Here, when the operation of the steering wheel 28 is changed from the returning operation to the turning operation by the steering wheel 28 passing through the neutral position at time t5, the steering speed (absolute value) becomes constant above the threshold S1. Therefore, when the turning operation is started at time t5, the controller 8 promptly increases the reducing torque (absolute value) according to the steering speed, while restricting the rate of change in the reducing torque to below the given threshold. Then, the controller 8 increases the reducing torque (absolute value) until the torque becomes the value corresponding to the steering speed. When the steering speed further decreases, the controller 8 decreases the reducing torque (absolute value) accordingly. Then, when the steering speed becomes below the threshold S1 at time t6, the controller 8 ends the torque decreasing control and the additional torque becomes 0. That is, the forward deceleration added to the vehicle 1 becomes 0.

Thus, in this embodiment, when the steering wheel 28 is under the returning operation from the state where it is turned in one direction, the controller 8 performs the torque increasing control so as to add the forward acceleration to the vehicle 1 until the steering wheel 28 returns to the neutral position (from time t3 to time t5), and when the steering wheel 28 is then turned to the other side after passing through the neutral position (at and after time t5), it ends the torque increasing control so as not to add the forward acceleration to the vehicle 1. Therefore, when the turning operation of the steering wheel 28 is carried out after crossing the neutral position, it can be prevented that the forward acceleration is added to the vehicle 1 by the increase in the torque generated by the motor generator 20, unlike the case where the torque increasing control is continued as illustrated by the broken lines in the graphs (c) and (d) of FIG. 7. Therefore, when the steering wheel 28 passes through the neutral position after the returning operation and the turning operation is then carried out, the maneuverability and the stability of the vehicle 1 can be improved, without giving discomfort to the driver.

In this embodiment, when the returning operation is carried out from the state where the steering wheel 28 passes through the neutral position and the turning operation is then carried out to the other side, the controller 8 performs the torque decreasing control so as to add the forward deceleration to the vehicle 1. Therefore, the forward deceleration can promptly be added to the vehicle 1 during the turning operation after passing through the neutral position, while suppressing discomfort given to the driver. Further, the maneuverability and the stability when the turning operation of the steering wheel 28 is carried out after passing through the neutral position can be improved to smoothen the behavior of the vehicle 1.

Further, in this embodiment, when the steering wheel 28 is returned after the turning operation, the controller 8 corrects the increasing torque so that the forward acceleration added to the vehicle 1 becomes smaller as the steering wheel 28 gets closer to the neutral position until the steering wheel 28 returns to the neutral position. Therefore, the rapid change in the additional torque when the returning steering wheel 28 passes through the neutral position can be avoided to prevent discomfort being given to the driver.

Further, since in this embodiment the controller 8 sets the additional torque at least based on the steering angle detected by the steering angle sensor 34, the vehicle attitude can promptly be controlled so that the response and the stability of the vehicle behavior with respect to the driver's steering operation are improved.

Further, since in this embodiment the controller 8 controls the torque generated by the motor generator 20, it can perform the torque decreasing control and the torque increasing control with the high response.

<Modifications>

Although in the above embodiment of the present disclosure is applied to the vehicle 1 having the motor generator 20 as the prime motor (driving force source), the present disclosure can also be applied to vehicles having an engine as the prime motor. In this case, for example, the ignition timing of the engine may be controlled in order to achieve the additional torque in the vehicle attitude control. That is, when performing the torque decreasing control, the ignition timing of the engine may be retarded from a reference ignition timing (an ignition timing according to the basic torque), and when performing the torque increasing control, the ignition timing may be advanced from the reference ignition timing.

Further, although in the above embodiment the torque outputted from the motor generator 20 (driving torque) is changed in order to achieve the additional torque in the vehicle attitude control, in another example, the additional torque by the vehicle attitude control may be achieved by changing regenerated torque inputted into the motor generator 20, instead of the driving torque of the motor generator 20. For example, when performing the vehicle attitude control while the motor generator 20 regenerates (e.g., while the accelerator opening is 0), the regenerated torque inputted into the motor generator 20 for braking the vehicle 1 may be increased or decreased so that the reducing torque or the increasing torque by the vehicle attitude control is achieved. That is, when performing the torque decreasing control, the regenerated torque (absolute value) may be increased, and when performing the torque increasing control, the regenerated torque (absolute value) may be decreased.

Further, although in the above embodiment the controller 8 acquires the additional torque at least based on the steering angle detected by the steering angle sensor 34, the additional torque may be acquired based on, instead of or in addition to the steering angle, operating states of the vehicle 1 other than the operation of the accelerator pedal (e.g., a lateral acceleration, a yaw rate, a slip ratio, etc.). For example, the controller 8 may set the additional acceleration or the additional deceleration based on a lateral acceleration inputted from the acceleration sensor 44, and a lateral jerk which can be obtained by differentiating the lateral acceleration with respect to time, and acquire the additional torque.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Wheel
8 Controller
20 Motor Generator
22 Inverter
24 Battery
26 Steering Device
28 Steering Wheel
34 Steering Angle Sensor
36 Accelerator Opening Sensor
40 Vehicle Speed Sensor
46 Brake Device

What is claimed is:

1. A control system for a vehicle, comprising:
a driving force source configured to generate torque for driving drive wheels of the vehicle;
a steering wheel configured to be operated by a driver;
a steering angle sensor configured to detect a steering angle corresponding to operation of the steering wheel; and
a controller configured to, based on the steering angle detected by the steering angle sensor, reduce the torque generated by the driving force source by a reducing torque to add deceleration to the vehicle when the steering wheel is being turned in one direction, and increase the torque by an increasing torque to add acceleration to the vehicle when the steering wheel is being turned back in the other, returning direction,
wherein the controller controls the torque generated by the driving force source, when the steering wheel is being turned in the returning direction from a state where the steering wheel is turned in the one direction, so as to add forward acceleration to the vehicle until the steering wheel returns to a neutral position, and when the steering wheel is then being turned in the other direction after passing through the neutral position, so as not to add the forward acceleration to the vehicle, and
wherein the controller is configured to set the reducing torque and the increasing torque, respectively, so that a rate of change of the torque generated by the driving force source is kept below a predetermined threshold.

2. The control system of claim 1, wherein the controller performs a control for reducing the torque generated by the driving force source so as to add forward deceleration to the vehicle, when the steering wheel is turned in the returning direction from a state where the steering wheel is turned in the one direction, and the steering wheel is then being turned in the other direction after passing through the neutral position.

3. The control system of claim 2, wherein the controller controls the torque generated by the driving force source so that the forward acceleration added to the vehicle becomes smaller as the steering wheel becomes closer to the neutral position, when the steering wheel is being turned in the returning direction from a state where the steering wheel is turned in the one direction, until the steering wheel returns to the neutral position.

4. The control system of claim 3, wherein the driving force source is an electric motor, the vehicle is an electric vehicle, and the controller controls the torque generated by the electric motor.

5. The control system of claim 1, wherein the controller controls the torque generated by the driving force source so that the forward acceleration added to the vehicle becomes smaller as the steering wheel becomes closer to the neutral position, when the steering wheel is being turned in the returning direction from a state where the steering wheel is turned in the one direction, until the steering wheel returns to the neutral position.

6. The control system of claim 5, wherein the driving force source is an electric motor, the vehicle is an electric vehicle, and the controller controls the torque generated by the electric motor.

* * * * *